United States Patent [19]

Heaslip et al.

[11] Patent Number: 5,634,026
[45] Date of Patent: May 27, 1997

[54] SOURCE IDENTIFIER FOR RESULT FORWARDING

[75] Inventors: Jay G. Heaslip; Miles G. Canada, both of Chittenden County, Vt.

[73] Assignee: International Business Machines Corporation, Armonk, N.Y.

[21] Appl. No.: 440,033

[22] Filed: May 12, 1995

[51] Int. Cl.[6] .................................................. G06F 9/28
[52] U.S. Cl. ............................................................ 395/393
[58] Field of Search ...................... 364/DIG. 1 MS File, 364/DIG. 2 MS File; 395/376, 390, 391, 392, 393, 394, 395, 800

[56] References Cited

U.S. PATENT DOCUMENTS

| | | | |
|---|---|---|---|
| 4,924,377 | 5/1990 | Kuriyama et al. | 395/500 |
| 5,202,975 | 4/1993 | Rasbold et al. | 395/375 |
| 5,226,126 | 7/1993 | McFarland et al. | 395/375 |
| 5,276,819 | 1/1994 | Rau et al. | 395/375 |
| 5,345,569 | 9/1994 | Tran | 395/375 |
| 5,467,473 | 11/1995 | Kahle et al. | 395/800 |
| 5,524,262 | 6/1996 | Colwell et al. | 395/800 |
| 5,548,776 | 8/1996 | Colwell et al. | 395/800 |

*Primary Examiner*—Robert B. Harrell
*Attorney, Agent, or Firm*—Whitham, Curtis, Whitham & McGinn; Ira D. Blecker

[57] ABSTRACT

In a method and apparatus for result forwarding, a source operand compare circuit for a reservation station for a superscalar processor having a plurality of execution units, includes a source identifier for identifying an execution unit that will produce a needed result. The source identifier is included with a rename tag associated with a respective source operand. A multiplexor controlled by the source identifier directs the result of an execution unit to a comparator. The comparator compares the rename tag with a specific reservation station identity. As a result of this comparison, the needed data result is supplied to the respective source operand.

19 Claims, 4 Drawing Sheets

SOURCE IDENTIFIER FOR RESULT FORWARDING

BACKGROUND OF THE INVENTION

1. Field of the Invention

The present invention generally relates to a superscalar processor (e.g., a processor capable of executing two or more instructions at a time) design for a computing apparatus and specifically to a superscalar processor for following and processing multiple instructions simultaneously.

More specifically, the invention is directed to a register renaming device which resolves inter-instruction operand dependencies within a superscalar processor. To achieve such an object, the invention provides a "source identifier" with a rename tag which reduces the number of compare operations needed in such a system and attendantly decreases chip size and increases chip speed and efficiency.

2. Description of the Related Art

Register renaming is a well-known method in the art in which inter-instruction operand dependencies can be resolved in a superscalar processor. Other well-known methods include register scoreboarding and the like.

Renaming registers are commonly used in pipeline processing systems that operate with superscalar processors so that dependencies between instructions that would otherwise slow processing, can be resolved. Oftentimes, the execution of an instruction must be postponed until the result operand of a previous instruction is derived. Therefore, many instructions are held in reservation stations awaiting the results of execution of other instructions.

The conventional renaming register checks the instruction operands for possible matches between instructions that require information and executed instructions that have the needed information. Each target operand of an instruction receives a rename tag that identifies the rename register that will contain the instruction's result.

To efficiently correlate a result with the instructions requiring that result, a structure must be established that keeps track of the renamed target and the architectural register represented by the renamed operand. Each source operand must be compared to this structure to determine if an instruction in the pipeline will modify the architectural resource, such as a general purpose register (e.g., a GPR), required by the source operand. In such a case, a "dependency" is said to exist.

If there is a dependency, there are two possibilities. First, the instruction that modifies the resource may have executed. Then, the result would be stored in the rename register and could be provided immediately to the instruction needing the information.

In a second possibility, the instruction that is to modify this architectural resource may not have executed. In this case, the source operand receives the rename tag for the resource that it requires. This type of structure/method requires each instruction to broadcast the rename tag for its result as it executes, so that waiting instructions can compare this rename tag with the rename tag associated with the waiting instruction's source operands and can determine if the waiting instruction requires this result. As mentioned below, depending on the architecture of the processor, this structure/method results in a relatively large number of compare operations (and attendant comparator circuits) which must be performed on each operand, and for each execution unit's result bus. Such a conventional system is disclosed in U.S. Pat. No. 5,345,569 to Tran in which the system resolves dependencies in a reorder buffer and identifies whether an instruction is ready to be issued.

Thus, in the conventional systems, a relatively large number of compare operations and an associated large number of comparators must be provided to perform the compare operations. This is a problem which increases chip size and decreases the processing speed and efficiency.

Also, means are required for keeping track of which results are needed by an instruction (e.g., an instruction having a dependent operand). Conventionally, a plurality of multiple comparator circuits associated with each instruction in a reservation station have been employed. The comparators have been used to interrogate results from each of the execution units. Thus, in an exemplary design having twelve (12) instructions in a reservation station, with 5 rewritable fields per instruction, and six (6) execution units, a total of 360 comparators is needed. Such a system has vastly reduced operating speed and dramatically increases the chip size.

FIG. 4 illustrates an exemplary conventional system which utilizes a comparator for each result bus at every operand position in the reservation station. FIG. 4 illustrates a source operand compare circuit 40. The reservation station must include one source operand compare circuit 40 for each source operand. Therefore, if there are nine (9) instructions and each instruction has two source operands, the reservation station requires 18 source operand compare circuits 40.

In FIG. 4, execution units 43 produce result data and a result tag 42. A comparator 41 is required for each execution unit 43 if each execution unit produces one result tag 42. Each of the result tags 42 are compared to a rename tag 44 contained in a rename tag field 45 of the source operand. The result of each of these compare operations is input to an OR function unit 46 (e.g., an eight-way OR function unit), to direct the associated execution unit result data to a source operand data field 47.

In sum, in a superscalar processor design with register renaming, each source operand of an instruction in the reservation station must have a comparator circuit for each of the execution units that can provide results that the instruction may depend upon. Thus, the conventional design typically requires a large number of comparators.

SUMMARY OF THE INVENTION

In view of the foregoing problems of the conventional systems, it is therefore an object of the present invention to provide a structure and method for reducing the number of compare operations (and thus comparators) necessary when a renaming register is used in a superscalar processor utilizing pipeline processing.

According to the present invention, a source identifier identifying an execution unit that will produce a needed result is included with a rename tag given to a source operand. A multiplexor controlled by the source identifier directs the result of an execution unit to a comparator that compares the rename tag with a specific reservation station identity. As a result of this comparison, the needed data result is supplied to the respective source operand.

In a first aspect of the invention, an apparatus according to the present invention is provided which includes multiple storage means for storing instructions, multiple execution units respectively connected to the respective storage means, means for identifying the execution unit for providing the result to a waiting instruction, wherein one storage means contains the identity of a specific execution unit, and means for directing a specific result to a specific instruction in the storage means. Each instruction waits for a result of only one specific execution unit.

In a second aspect of the invention, a method according to the present invention is provided which includes steps of storing an instruction in a storage means, identifying the execution unit for providing a needed result to a waiting instruction, wherein the storage means contains the identity of the execution unit, receiving the identity information of the execution unit and directing the result to an appropriate waiting instruction. Each instruction waits for a result of only one specific execution unit.

Thus, with the invention, a comparator circuit for a reservation station can determine which execution unit will be providing a given result required by a waiting instruction. The execution unit information is added to the rename tag, as a "source identifier".

With this information now known to the waiting instruction, the waiting instruction need not interrogate the results from each of the execution units to determine which is the source of the needed result. Thus, the number of comparators can be reduced.

With the inventive structure and method, the results from all of the execution units can be input to a multiplexor, with only the result from the identified source being used by the instruction. Thus, the invention reduces the number of comparators which not only reduces chip area, but which also helps to reduce the cycle time, thereby increasing processing speed and efficiency.

Other advantages of the present invention include reduced power consumption and the ability to easily scale the design by simply adding execution units since each additional execution unit only requires an additional multiplexor input.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
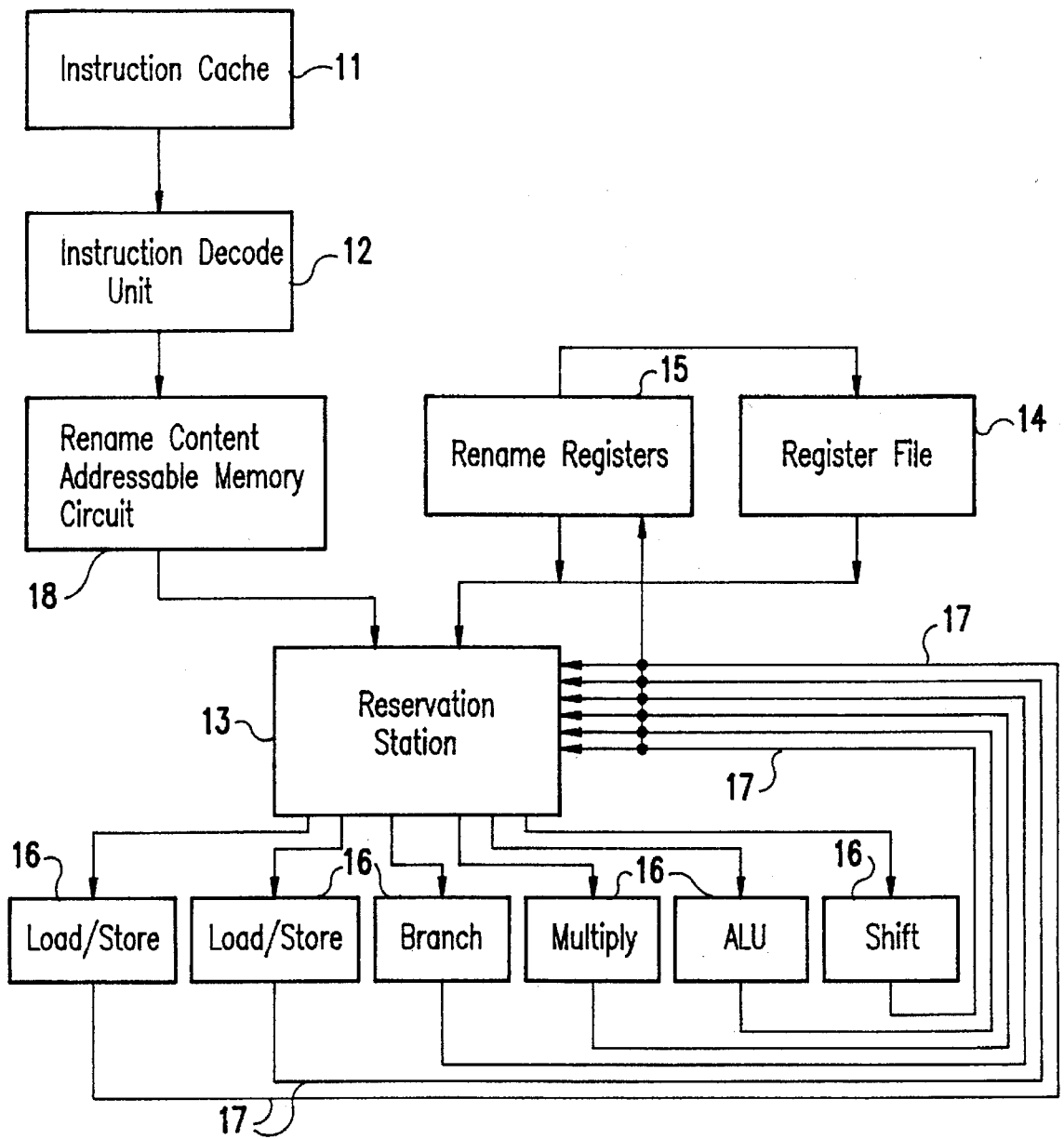
FIG. 1 is block diagram of an overall exemplary system which incorporates the comparator structure of a reservation station according to the invention.

Referring now to the drawings, and more particularly to FIG. 1, a block diagram of an overall exemplary system is shown which incorporates the source operand comparator circuit structure for a reservation station according to the present invention.

As shown in FIG. 1, instructions are stored in an instruction cache 11. Instructions are read from the instruction cache 11 under control of a fetch unit (not shown). After being decoded by an instruction decode unit 12, an instruction is evaluated by a rename content addressable memory (CAM) circuit 18.

The circuitry for the cache 11, the decode unit 12, rename registers 15 (discussed below) and the rename CAM circuit 18 is believed to be well-known to one of ordinary skill in the art within the purview of this application. Thus, for brevity, such circuitry will not be described herein.

The rename CAM circuit 18 evaluates the decoded instruction to determine whether data required by the source operands of the instruction has been produced by an execution unit and, therefore, whether the data required already exists in a reservation station 13 or a register file 14. If the data is available, the rename CAM circuit allows the instruction to execute by operating one or more of the execution units 16 and the instruction is subsequently written to the register file 14.

Conversely, if the data required by the source operand is not available, but will be produced by another instruction, a "dependency" exists.

If the rename CAM circuit 18 determines that a dependency exists for a source operand of an instruction, the rename CAM circuit associates a rename tag and a source identifier with the source operand. Such an association by the rename CAM circuit is described below. The rename tag indicates which other instruction will call upon an execution unit to produce the data that the source operand needs. The source identifier indicates which execution unit, of the multiple execution units 16, will produce the data that the source operand needs.

As explained in more detail below with respect to FIG. 3, the rename CAM circuit 18 associates the rename tag and the source identifier with a specific source operand by writing the rename tag of the corresponding instruction in the respective field associated with the source operand slot in the reservation station.

Similarly, the identity of the respective execution unit is written in the respective field associated with the source operand in the reservation station. Thus, the identity of the instruction that will activate an execution unit and the identity of the execution unit are associated with a source operand that needs the data that will be provided by that execution unit.

Then, the rename CAM circuit 18 stores the instruction, including the rename tag and source identifier associated with each source operand of the instruction, in a reservation station 13.

Each instruction in the reservation station 13 obtains data from one of three sources: 1) the register file 14; 2) the rename registers 15; or 3) one of the execution units 16. In the exemplary system shown in FIG. 1, there are six execution units. Each execution unit 16 has a result bus 17 which supplies the data produced by the execution operation and a result tag to the reservation station 13 and the rename registers 15.

Thus, each instruction is held by the reservation station 13 until information needed by all the instruction's source operands is available. When the information is available, the instruction is allowed to execute and is eventually written to the register file 14.

Figure 2:
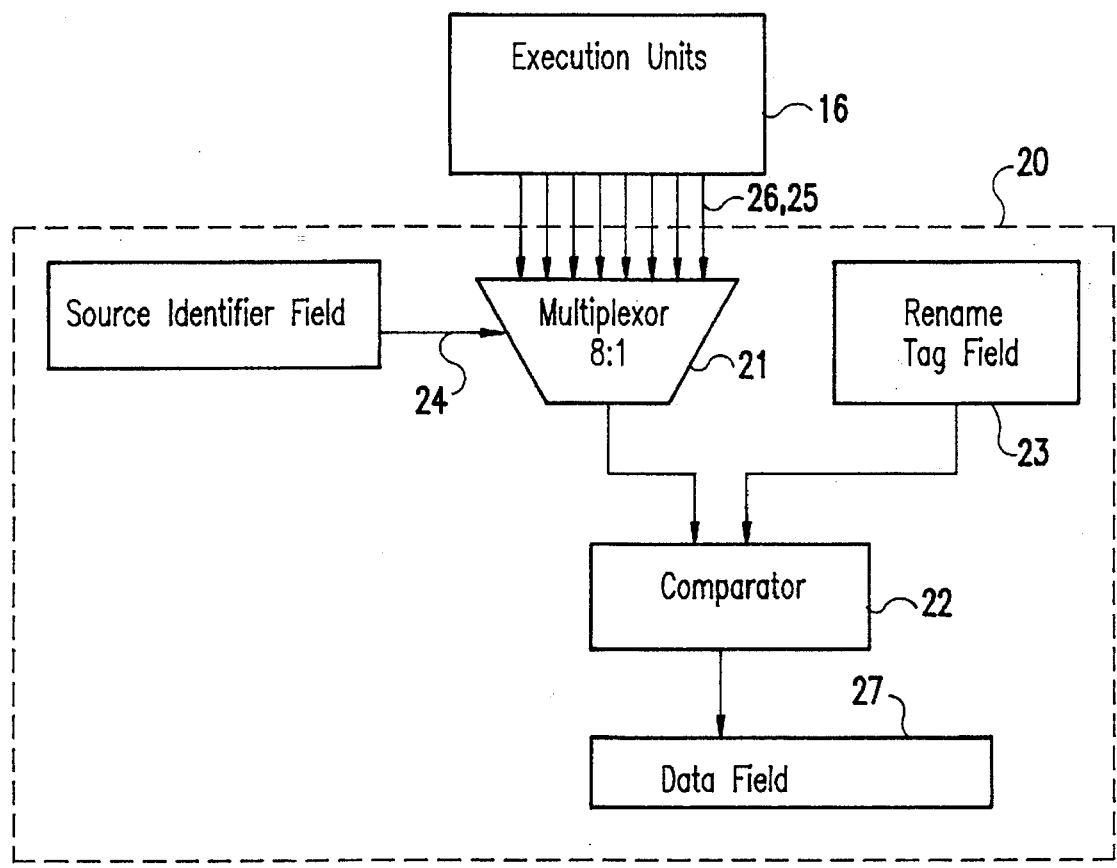
FIG. 2 is a block diagram of a source operand comparator circuit of a reservation station according to the present invention and illustrates the instruction flow according to the present invention.

FIG. 2 illustrates a block diagram of a source operand comparator circuit 20 included in the reservation station 13 for a source operand and includes the instruction flow according to the present invention.

Figure 4:
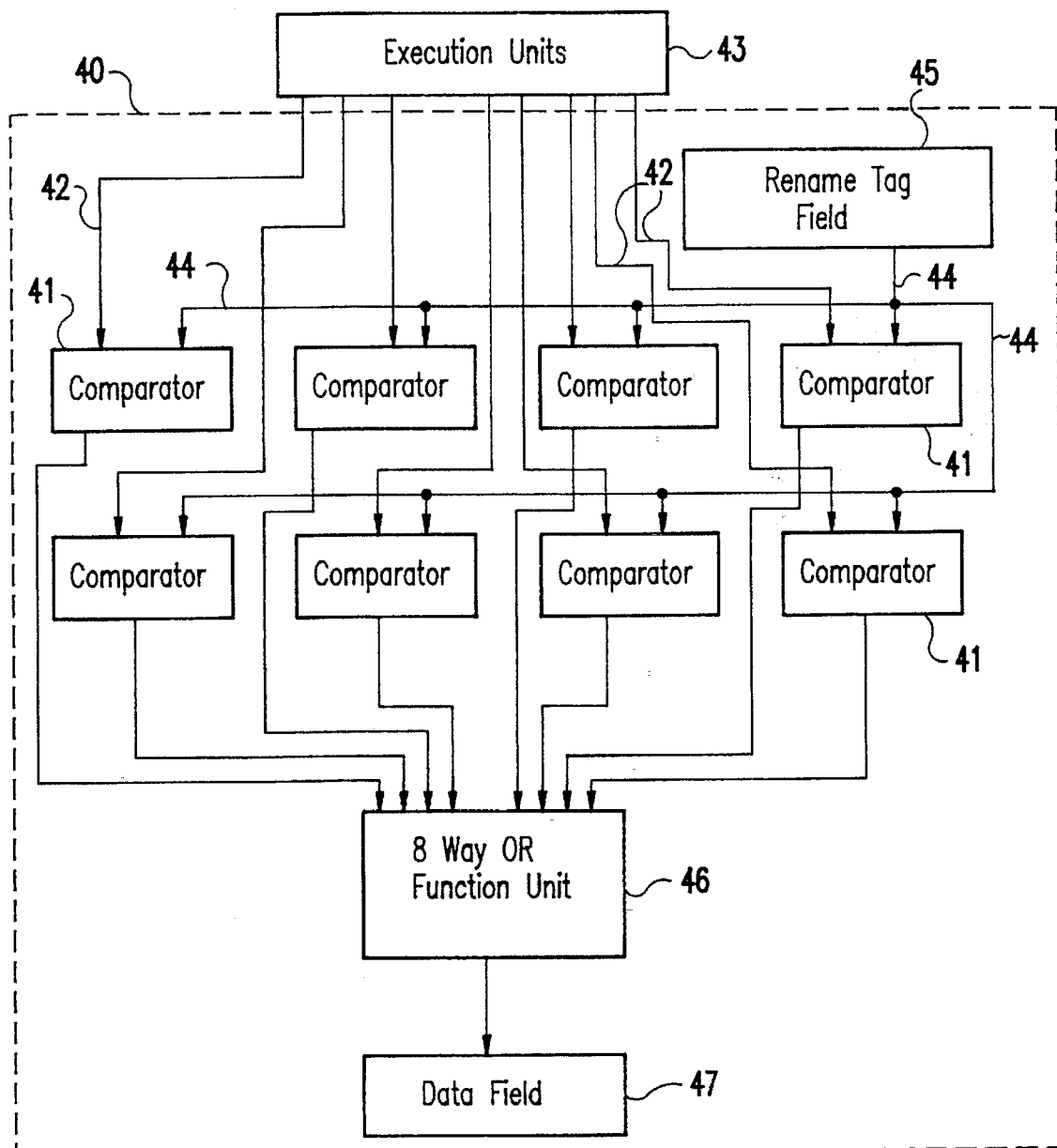
FIG. 4 is a block diagram of the structure of a conventional source operand comparator circuit utilizing a rename tag, multiple comparators and an OR circuit.

Similarly to FIG. 4 described above, FIG. 2 illustrates one source operand compare circuit 20. The reservation station 13 includes one source operand compare circuit 20 for each source operand slot provided in the reservation station.

Thus, for example, for nine (9) instructions, each instruction having two source operands, the reservation station requires 18 source operand compare circuits 20.

As shown in FIG. 2, a multiplexor 21 receives execution unit result data 25 and result tag(s) 26 on bus 17 from execution unit(s) 16 at a rust input. The result data 25 and the result tag(s) 26 can be sent by each respective execution unit as one unit of information or can be sent as separate units of information. Additionally, the result data 25 and the result tag(s) 26 can be sent on a common bus 17 (as depicted in FIG. 1) or there can be two busses per execution unit, one for the result data 25 and one for the result tag(s) 26. Further, a common data bus can be utilized by all execution units instead of the separate dam busses shown in FIG. 2.

Multiplexor 21 receives a source identifier 24 from the source identifier field of the source operand, at a second input. The source identifier 24 is for controlling the multiplexor 21 and accompanies each rename tag assigned to a source operand. The source identifier 24 points to (e.g., identifies) the execution unit 16 which will provide the result needed by the source operand.

More specifically, the source identifier 24 sets up the multiplexor 21 for steering result tags 26, being sent back from the execution units 16, to a comparator 22. Comparator 22 compares the result tag 26 with the rename tag 23.

The multiplexor 21 issues an output to the comparator 22 which, as mentioned above, compares result tags 26, being sent back from the execution unit 16, with rename tags 23. The circuitry for the comparator 22 and the multiplexor 21 is believed to be well-known to one of ordinary skill in the art within the purview of this application and thus, for brevity, will not be described herein. The multiplexor 21 is preferably an 8:1 multiplexor (as shown in FIG. 2) or the like, but can be any type of multiplexor depending upon the designer's requirements and system configurations.

Based upon the inputs thereto, the comparator 22 outputs the result data 25 from the execution units 16 to the respective source operand's data field 27, so that the waiting instruction can use the data to perform the instruction's operations.

Figure 3:
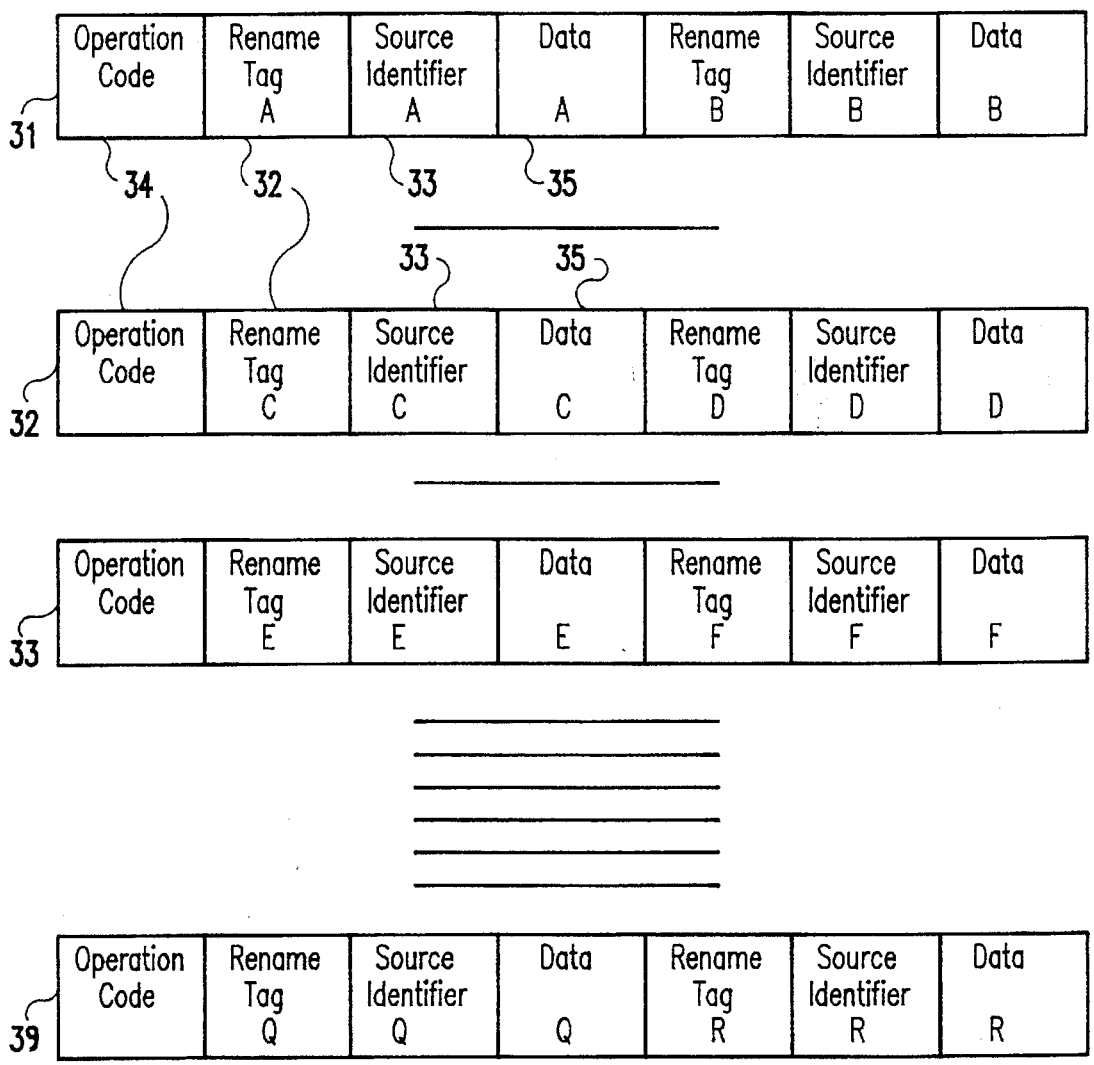
FIG. 3 is a block diagram of the detailed field structure within the reservation station according to the present invention.

FIG. 3 is a detailed block diagram of the fields of the instructions stored in the reservation station 13, showing the format of each entry (e.g., each instruction) and also showing that there is a number of such entries in a given reservation station.

FIG. 3 shows an example of a reservation station 13 holding instructions 31, 32, 33 . . . 39, with each instruction having two source operands. For example, instruction 31 has a source operand A and a source operand B. Each source operand has a rename tag 32 and a source identifier 33. An operation code 34 identifies a type of operation to be performed by the instruction.

As mentioned above, each source operand has its own source operand comparator circuit. Therefore, incorporating the exemplary format shown in FIG. 3 with the structure shown in FIG. 2, the source identifier A controls the multiplexor 21 so that the multiplexor 21 looks only to one specific execution unit 16 of the multiple execution units 16. When the specific execution unit 16 executes, the result tag 26 which is produced is input to the comparator 22. The rename tag A is also input to the comparator 22 and, if the rename tag A and the result tag 26 are the same, the data produced by the execution unit's operation is written to the data field A.

Similar processing occurs with respect to source operand B. Upon attaining data A and data B, instruction 31 executes, and produces a result. Then, the instruction, with its result, is stored in the respective rename register 15 and is subsequently stored in register file 14.

In sum, the source identification field steers the result tags 26 coming back from execution, so that only one comparator 22 is required in the reservation station for each operand slot.

For a superscalar processor that includes many execution units, many reservation station slots and operand slots, the structure of the invention provides a significant area savings as compared to the conventional systems.

Thus, with the invention, the number of comparators can be reduced by the number of multiplexor inputs steered by the source identifier. For example, in the system of FIG. 2, the number of comparators can be reduced by a factor of eight over the conventional systems. The decreased number of comparators decreases the amount of chip area needed and further decreases the processing cycle time, thereby enabling the result bus selection to be performed as early as possible.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for use with a system including a superscalar processor for simultaneously processing multiple instructions, a plurality of storing units each for storing a plurality of instructions and a plurality of results of said instructions, a plurality of execution units for executing said instructions and means for determining whether a first instruction of said plurality of instructions is dependent upon a result of a second instruction of said plurality of instructions; said apparatus comprising:

first storage means containing first identity information comprising an identity of a first storage unit of said plurality of storage units, said first storage means for storing said second instruction and said result;

second storage means containing second identity information comprising an identity of a first execution unit, said first execution unit for executing said second instruction;

means for associating said first storage means and said second storage means with said first instruction;

means for selectively receiving a plurality of specific results from said first execution unit based on said second identity information; and means for comparing said plurality of specific results received by said means for selectively receiving with said first identity information, wherein said means for comparing directs said result to said first instruction to allow execution of said first instruction.

2. An apparatus as in claim 1, wherein said first storage means comprises a rename tag field.

3. An apparatus as in claim 1, wherein said second storage means comprises a source identifier field.

4. An apparatus as in claim 1, wherein said first identity information comprises a rename tag.

5. An apparatus as in claim 1, wherein said second identity information comprises a source identifier.

6. An apparatus as in claim 1, wherein said means for selectively receiving comprises a multiplexor and said means for comparing comprises a comparator.

7. An apparatus as in claim 1, wherein said result comprises first identity information and result data.

8. An apparatus as in claim 1, wherein said result comprises a rename tag and result data.

9. An apparatus for a superscalar processor for processing instructions, said superscalar processor including a plurality of execution units, a reservation station including at least one operand slot for storing an operand, a plurality of registers for providing a first input to said reservation station, and a memory for providing a second input to said reservation station, said apparatus comprising:

a operand compare circuit provided in said reservation station, said operand compare circuit including:

a multiplexor for receiving inputs from said plurality of execution units;

an identifier, associated in advance, with an operand and a rename tag of an instruction, said identifier being stored in said reservation station and for controlling said multiplexor to selectively issue one of said inputs from said plurality of execution units as an output;

a comparator for receiving, as a first input, said output from said multiplexor;

means for issuing a second input to said comparator, said comparator comparing said first input with said second input and providing an output; and a field for receiving said output from said comparator, such that said output received by said field is usable by a waiting instruction so as to perform an operation contained in said waiting instruction.

10. An apparatus as in claim 9, wherein each of said inputs to said multiplexor includes a result tag and a result data.

11. An apparatus as in claim 9, wherein said identifier is provided from an identifier field of an operand stored in said reservation station.

12. An apparatus as in claim 9, wherein an operand compare circuit is separately provided for each of said at least one operand slot in said reservation station.

13. An apparatus as in claim 9, wherein said identifier accompanies each rename tag assigned to an operand stored in said reservation station, said identifier for identifying an execution unit of said plurality of execution units, which is to provide a result needed by an operand.

14. An apparatus as in claim 9, wherein said identifier forwards result tags sent from said execution units to said comparator.

15. An apparatus as in claim 9, wherein said second input to said comparator comprises a rename tag associated with an operand stored in said reservation station.

16. An apparatus as in claim 9, wherein said second input to said comparator comprises a rename tag associated with an operand stored in said reservation station and wherein said first input comprises a result tag;

wherein, when said first and second inputs are equal, said comparator issues result data to said field of said operand stored in said reservation station.

17. An apparatus as in claim 9, wherein said identifier includes means for controlling said multiplexor such that said multiplexor allows an input of only one of said plurality of execution units to be issued as an output of said multiplexor to said comparator.

18. An apparatus as in claim 9, wherein said operand includes a source operand and said filed includes a data field.

19. A method for processing instructions in a superscalar processor, said superscalar processor including a plurality of execution units, a reservation station including at least one operand slot for storing an operand, a plurality of registers for providing a first input to said reservation station, and a memory for providing a second input to said reservation station, said method comprising:

providing inputs to a multiplexor from said plurality of execution units;

associating, in advance, an identifier with an operand and a rename tag of an instruction, and storing said identifier in said reservation station;

controlling said multiplexor by said identifier to selectively issue one of said inputs from said plurality of execution units as an output;

providing, as a first input, said output from said multiplexor to a comparator;

issuing by a rename tag field a second input to said comparator;

comparing said first input with said second input and providing an output to a field in said reservation station; and using, by a waiting instruction, said output received by said field, so as to perform an operation contained in said waiting instruction.

* * * * *